April 21, 1959
M. R. SMITH
2,883,335
HYDROCARBON CONVERSION SYSTEM
Filed July 1, 1953
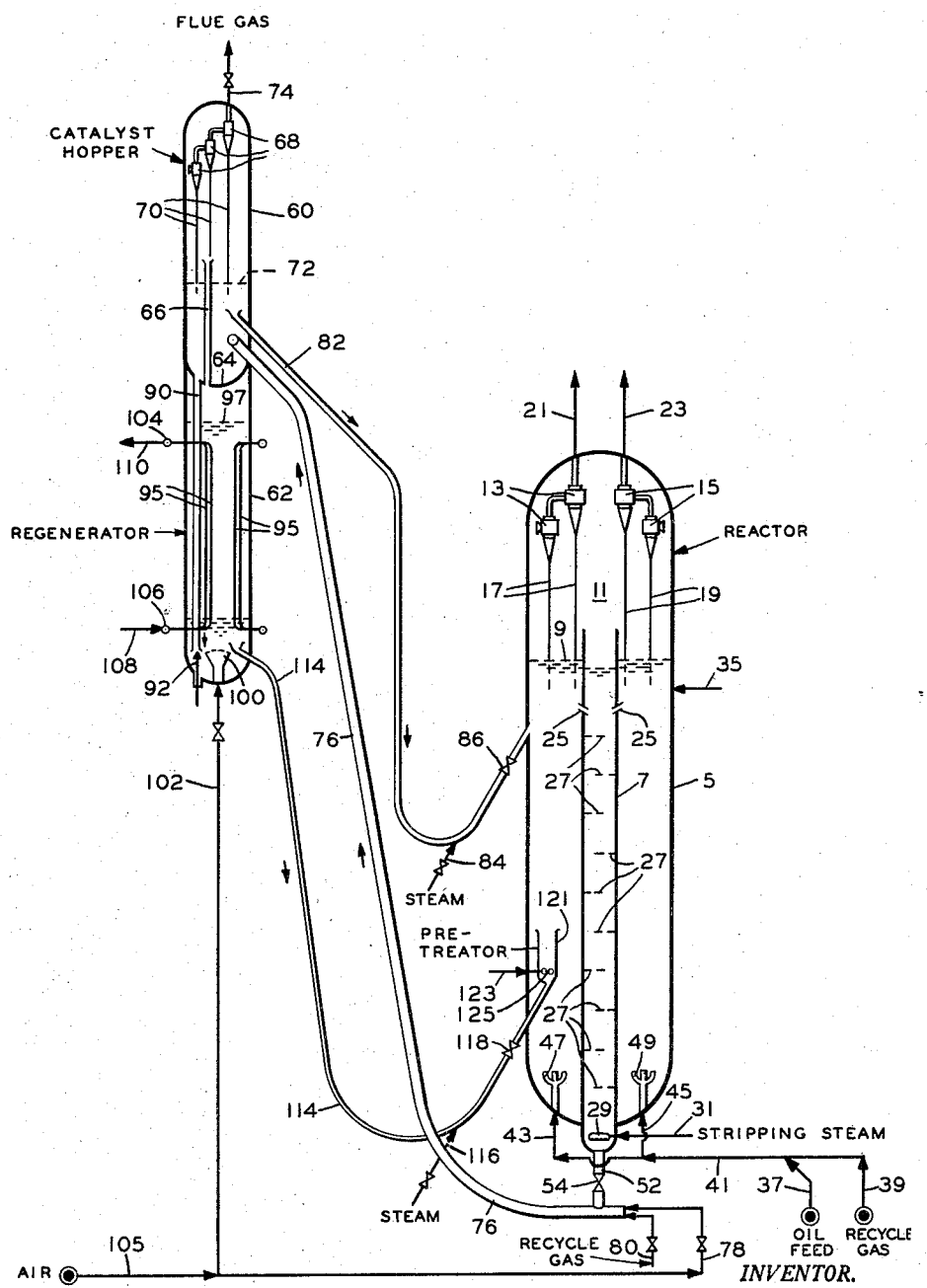
INVENTOR.
MARTIN R. SMITH
BY G. H. Palmer
T. C. Virgil
ATTORNEYS

United States Patent Office 2,883,335
Patented Apr. 21, 1959

2,883,335

HYDROCARBON CONVERSION SYSTEM

Martin R. Smith, Glen Ridge, N.J., assignor to The M. W. Kellogg Company, Jersey City, N.J., a corporation of Delaware Application July 1, 1953, Serial No. 365,382

18 Claims. (Cl. 208—160)

This invention relates to an improved moving bed process, and more particularly, it is concerned with improved method and means of operating a fluid hydroforming process whereby the production of high antiknock gasoline and the recovery thereof are effected economically and efficiently.

In fluid systems for endothermic reactions, there is the problem of supplying heat without seriously affecting the production of desirable product. This problem is more acute in the case of reactions involving low catalyst to oil ratios, because high catalyst circulation rates cannot be utilized as a means for supplying a substantial part of the heat requirement. With regard to the fluid hydroforming process, in the past, the endothermic heat of reaction was supplied primarily by heated recycle gas. Such a scheme has the disadvantage of requiring an unusually high recycle gas temperature, in the range of about 1200°–1300° F., which may adversely influence product distribution, as well as a high gas rate which is costly to maintain. There exists the need for supplying heat to an endothermic reaction zone in such a way that little or no effect is had on the reaction at a low operating cost. By means of the present invention, there is provided a scheme whereby the disadvantages of prior art processes are substantially overcome.

An object of this invention is to provide an improved method of supplying heat to an endothermic zone in a moving bed system.

Another object of this invention is to provide method and means for supplying heat to the endothermic reaction zone of a hydrocarbon conversion process.

Still another object of this invention is to provide an improved fluid hydroforming process.

A further object of this invention is to provide method and means for fluid hydroforming whereby the gasoline product is produced economically and efficiently.

Other objects and advantages of this invention will become apparent from the following description and explanation thereof.

By means of the present invention, heat is supplied to an endothermic contacting zone by withdrawing a portion of contact material therefrom and passing the same to a combustion zone to which there is charged oxygen containing gas and a combustible material under conditions for the burning of the combustible material and the absorption of heat by the solid contact material, and circulating the heated contact material to the endothermic zone. In a hydrocarbon conversion process where carbonaceous material is produced in the endothermic reaction zone and causes temporary deactivation of the catalyst, one portion of catalyst is withdrawn and passed to a first regeneration zone wherein it is treated with oxygen containing gas for the removal of carbonaceous material to the extent that it is produced in the endothermic zone and a second portion of catalyst from the endothermic zone is passed to a second regeneration zone in which combustible material from another source is burned preferentially with an oxygen containing gas to generate heat for absorption by the contact material circulated to the endothermic zone without affecting significantly the carbonaceous content of the catalyst.

The present invention is applicable to a moving bed system in which a contacting zone requires heat for any desired purpose. The type of system contemplated can be fluid or non-fluid in which the contact material can be of the finely divided form or of larger particle size. In a fluid system, the particles vary in size from about 1 to about 250 microns, more usually, about 10 to about 100 microns. In a non-fluid system, the contact material can vary in particle size to any extent whatsoever, however, more usually, the particles vary from about 250 to about 10,000 microns. In any system, it is necessary for the practice of this invention to have a moving bed operation, in order that the contact material being used in the endothermic contacting zone can be transported to a second zone in which combustible material is burned with an oxygen containing gas to generate heat for utilization in the endothermic zone. Processes which are especially adapted for use hereunder are, for example, desulfurization, dehydrogenation, cracking, etc. Those processes employing low catalyst to oil ratios are especially suited for the application of the present invention. Generally, for example, those processes having a catalyst to oil ratio which varies from about 0.05 to about 2.5, are especially suitable or adapted for the present invention.

In catalytic processes involving the conversion of hydrocarbons, there is produced, generally, a carbonaceous material in varying quantities, depending upon the reactions involved, which causes temporary deactivation of the catalyst. In order to regenerate the catalyst, it is contacted with an oxygen containing gas at a temperature of about 600° to about 1250° F., more usually, about 950° to about 1100° F. The types of catalysts now being employed for the conversion of hydrocarbons requires, in general, that the temperature of regeneration does not exceed the upper limits specified above, otherwise, an undesired rate of decrease in catalytic activity is experienced which may be unsuitable for commercial application. By means of the present invention, it is contemplated regenerating the catalyst for restoration of catalytic activity in accordance with the techniques known heretofore. This is accomplished by circulating catalyst from the endothermic reaction zone to a combustion or regeneration zone at a rate sufficient to maintain the desired catalytic activity in the endothermic zone by the removal of carbonaceous material to the extent required. In other words, if the process in question is operated conventionally at a catalyst to oil ratio of 1, by means of the present invention, the catalyst being circulated for complete regeneration is maintained at the same catalyst to oil ratio. The amount of carbonaceous material which is deposited or produced in the endothermic reaction zone is removed by combustion in a single combustion zone, in the manner practiced heretofore.

In processes involving the deposition of combustible material on the solid contact material, such as in the conversion of hydrocarbons, the contact material, under steady state conditions, acquires a carbonaceous content which is dependent upon all of the conditions present in the endothermic zone. This may be termed, for the purposes of this specification and the appended claims, as the "equilibrium coke content" or "equilibrium combustible material content." When the equilibrium coke content is varied, changes in product distribution can be expected. For example, lowering the coke content of a catalyst below the equilibrium level may cause an adverse effect upon product distribution such as a greater production of carbonaceous material and a smaller production of normally liquid product. When a process has attained a steady state condition, it appears that any change in the coke content by external factors is compensated by adjustment in coke production within the system to restore the equilibrium coke level. In the event that a portion of the catalyst, other than is being circulated for maintenance of catalytic activity, were regenerated partially, there would be an increase in coke production above the quantity normally produced under steady state conditions by reason of the change in the equilibrium coke content of the catalytic material. Accordingly, it appears disadvantageous to utilize the technique of partial regeneration of catalyst for supplying heat to an endothermic reaction by reason that the equilibrium coke content of the catalyst is upset and the system compensates by a change in the production of coke or carbonaceous material. To overcome this disadvantage, it is proposed, by means of the present invention, to burn a combustible material which is supplied from an external source with an oxygen containing gas in the presence of a portion of contact material from the endothermic zone under conditions such that the externally supplied combustible material is burned preferentially.

The combustible material which is supplied externally for the purpose of generating heat can be liquid, gas or solid such as, for example, coal, coke, hydrogen, carbon monoxide, light hydrocarbon material, fuel oil, gas oil, furnace oil, kerosene, gasoline, etc. The combustible material and oxygen are supplied to a second combustion zone at sufficient rates such that, upon combustion, they will generate the heat required for utilization in the endothermic zone. The equilibrium coke content of the contact material is maintained at essentially the same level as existed prior to being charged to the second combustion zone. In the selection of a combustible material, it is important to employ one which is preferentially burned in the presence of the combustible material deposited on the contact material. Usually, the combustible material is gaseous or liquid by reason that such materials tend to burn preferentially to the coke or carbonaceous material which is generally present on the contact material. Accordingly, the equilibrium coke content of the contact material remains at essentially the same concentration as it existed prior to being charged to the second combustion zone, and the only important change is that it acquires sensible heat by reason of the heat generated in this zone. In effect, heat can be supplied to a conventional system by means of this invention, without disturbing the equilibrium conditions which exist in the endothermic zone. The oxygen containing gas which is employed for the combustion of the combustible material can be any oxygen containing gas such as, for example, oxygen, air, enriched air, etc.

The quantity of catalyst which is heated by burning of combustible material with an oxygen containing gas in the second combustion zone varies considerably, depending upon the needs of a particular situation. A system requiring a small amount of heat will be operated with a low catalyst rate; whereas a system requiring a large amount of heat will use a high catalyst rate. The catalyst rates mentioned are in addition to that portion being circulated for maintenance of catalytic activity in the endothermic reaction zone. For the purposes of this invention, it is convenient to express the catalyst rate needed for the supply of heat in terms of a ratio with respect to the catalyst rate which is used for the maintenance of catalytic activity in the endothermic zone. It should be understood, however, that while this ratio is being expressed as a relative catalyst rate, it is also intended for the purpose of this invention to include the relative rate or ratio in situations involving contact materials of a non-catalytic nature. Accordingly, the ratio of the quantity of contact material or catalyst being circulated for the purpose of supplying heat to the amount of catalyst being circulated for catalyst activity maintenance is about 1 to 1 to about 5 to 1, more usually, about 1.5 to 1 to about 3.5 to 1 of the former to the latter. Further, it was mentioned hereinabove that the catalytic material in the usual hydrocarbon conversion system is heated to a temperature of not greater than about 1250° F. by reason that permanent deactivating effects take place to an undesired extent at higher temperatures. This temperature limitation does not necessarily apply to all processes in which the contact material is of a catalytic or non-catalytic nature, hence, the temperature of the contact material which supplies heat to the endothermic zone can vary up to about 1500° F. or higher. The heated regenerated solids and/or heat carrying solids can be recycled to the endothermic contacting zone at the same temperature or at different temperature levels which can be about 25° to 300° F., more usually, about 75° to 250° F., greater than the temperature in the endothermic zone. As to the equilibrium coke content of the contact material or catalyst, this can vary to the same extent as known in the prior art. For example, the equilibrium coke content can vary from about .01 to about 15% by weight of the total solid content material, although the present invention is usually applied to processes in which the equilibrium coke content varies from about .1 to about 3% by weight, based on the total catalyst or solid contact material. The equilibrium coke content also serves to designate the equilibrium content of combustible materials of a different chemical nature for the purposes of this invention.

The present invention is particularly applicable for fluid hydroforming of light hydrocarbon oils. In the conventional process, low catalyst to oil ratios in the order of about 0.1 to about 2.0 are employed and the coke production is such that heat must be supplied by means other than by the use of high catalyst to oil ratios. In the hydroforming process, coke is produced in an amount of about 0.01 to about 1% by weight, based on the oil feed. The fluid catalyst can be one which has the property of producing aromatics by dehydrogenation, dehydrocyclization, isomerization, etc. Examples of catalyst which can be used are the oxides and/or sulfides of metals of groups V and VI as well as the noble metals of group VIII of the periodic table. Another group of catalysts which can be used for this process are the heteropoly acids such as, for example, phosphomolybdic acid, aluminomolybdic acid, silicomolybdic acid, etc. Additional specific examples of catalytic material are tungsten oxide on alumina, molybdenum trioxide on alumina, chromia on alumina, nickel-tungsten-sulfide on alumina, cobalt molybdate on alumina, etc. It is apparent that any catalytic material which is used for hydroforming light hydrocarbon oils can be employed in the present invention. Generally, the catalytic element, aside from the support material, is used in amounts of about 0.1 to about 25% by weight, based on the total catalyst. Accordingly, any reforming catalyst which is known to those skilled in the art can be employed in the practice of this invention.

In the operation of a fluid hydroforming process, the reaction temperature can be varied from about 750° to about 1100° F. The pressure of the operation is usually maintained at a suitable level for the maintenance of a desired hydrogen partial pressure. The total pressure can vary from about 25 to about 1000 p.s.i.g.; whereas the hydrogen partial pressure, based on inlet conditions, can vary from about 15 to about 950 p.s.i.a. The weight space velocity can vary from about .05 to about 15, more usually, .1 to about 3.0, measured as the pounds of oil feed being charged to the reforming zone on an hourly basis per pound of catalyst which is present therein. It is also customary to designate the amount of hydrogen which is charged to the reforming zone in terms of the standard cubic feet of hydrogen or hydrogen-rich gas (measured at 60° F. and 760 mm.) per barrel of oil feed which is charged to the same zone (1 barrel=42 gallons). In general, on this basis, the hydrogen or hydrogen-rich gas rate varies from about 500 to about 15,000 s.c.f.b., more usually, from about 1000 to about 10,000 s.c.f.b. Heretofore, it was the practice to employ a larger quantity of hydrogen as feed to the reforming zone than was required for the reaction by reason that the hydrogen containing gas was supplied at a temperature and a quantity which was sufficient to satisfy at least in part the endothermic heat requirements of the process. For example, in commercial practice, under a given set of operating conditions, a hydrogen rate of 5000 s.c.f.b. is selected, utilizing a recycle gas from the process containing about 55% by volume of hydrogen. By means of the present invention, it is contemplated, under the same conditions, employing substantially less recycle gas. This modification to the conventional fluid hydroforming process results in many economies resulting from the use of a substantially smaller quantity of recycle gas.

The conditions of operation enumerated above are selected on the basis of providing a net production of hydrogen such that there is no need for the use of extraneous hydrogen. In some instances, it is desirable to pretreat freshly regenerated catalyst with hydrogen containing gas in order to enhance the activity of the catalyst. This procedure can be followed in the case of a molybdenum oxide catalyst and a heteropoly acid catalyst, such as phosphomolybdic acid on alumina. For reasons not too clearly understood, the pretreatment of catalyst with hydrogen, with or without the presence of a small amount of water, effects an increase in catalytic activity for hydroforming reactions. Hence, the reforming catalyst can be pretreated with hydrogen containing gas or recycle gas from the same process at a temperature varying in the range of the reaction temperature enumerated above, as well as under the pressure specified above for the reforming reaction.

In order to provide a fuller understanding of the present invention, reference will be had to the accompanying drawing which forms a part of this specification.

The reactor 5 is a vertical, cylindrical vessel having an internal diameter of approximately 23 feet and a length of about 91 feet on the straight side portion thereof. Situated in a concentric position within the reactor 5 is a stripper 7, which has a length of 100 feet and an internal diameter of 7½ feet. In the annular space formed by the reactor 5 and the stripper 7, there is a dense fluidized mass of finely divided catalyst material having a level 9. The catalyst comprises 9% by weight of molybdenum trioxide supported on alumina containing approximately 2% by weight of silica. In disengaging zone 11, above the dense bed of catalyst material in the reactor, a substantial part of entrained catalytic material is disengaged and any catalyst fines remaining entrained in the effluent gaseous product are separated to a substantial extent by means of two sets of cyclones 13 and 15, each set consisting of a pair of cyclones in series with each other. The sets of cyclones 13 and 15 have diplegs 17 and 19, respectively, the ends of which are submerged in the upper part of the dense catalyst bed. The reaction product effluent is divided into two portions, one portion being discharged by the cyclone set 13 into a product line 21, and the other portion of reaction product is discharged from the reaction system through cyclone set 15, and thence, through a second product line 23. The upper end of stripper 7 terminates about 10 feet above catalyst level 9, in order that stripped products do not intermingle with the reactor catalyst bed. Spent catalyst is withdrawn directly from the dense bed in the reactor by means of louvres 25, which are openings in stripper 7 located at diametrically opposite positions and situated about 5 feet below the top end of the stripper 7. In order to improve the stripping efficiency, the stripper 7 is provided with staggered baffles 27 which are positioned in an alternate fashion along the inside length of the stripper at equal distances of approximately 10 feet. The stripping gas, which can by steam, recycle gas, flue gas, etc., is introduced into the stripper through a circular distributor 29 by means of a supply line 31. Any catalytic material remaining in the reaction product after passing through the cyclone sets 13 and 15 is recovered substantially as a slurry in polymer product, and it is returned to the upper part of the dense bed in the reactor 5 by means of line 35. The catalyst slurry line is situated about 5 feet below the catalyst level 9 in the reactor. Vaporized oil feed is supplied through a line 37 and heated recycle gas is supplied through a line 39; both streams are combined in a single line 41, which divides into lines 43 and 45, prior to entering the bottom end of reactor 5. The reactant inlets 43 and 45 are connected to spider distributors 47 and 49, respectively. These distributors serve to disperse the reactant materials in a uniform fashion across the cross-sectional area of the reaction zone. Stripped catalyst is withdrawn from the bottom of stripper 7 through a standpipe 52 in which there is installed a slide valve 54 for the purpose of controlling automatically the flow of catalyst therethrough.

The regeneration system of this process comprises two regenerators, one for the purpose of regenerating completely the catalytic material at a desired temperature and the other serving to heat a portion of the spent catalyst to a desired temperature without affecting significantly the carbon content of the catalyst. In the system, the heating vessel 60 superimposes the complete regenerator 62 and is separated therefrom by means of a partition 64, which defines the lower end of heating vessel 60. The heating vessel 60 and the regenerator 62 are in direct communication by means of a conduit 66 which serves the purpose of passing flue gas from the lower regenerator to the higher heating vessel 60. The flue gas is transferred from the lower regenerator to the upper heating vessel, in order to utilize a single set of cyclones 68, located in the upper part of heating vessel 60. Catalytic material which is entrained in the flue gas is separated to a substantial extent by means of cyclones 68, and it is returned by means of diplegs 70 to the catalyst bed of the heating vessel 60 having a level 72. The flue gas produced in the regenerator 62 and the flue gas from heating vessel 60 are discharged from the upper end of the heating vessel through a valved line 74. Spent catalyst which has been stripped is passed from stripper standpipe 52 into transfer line 76. At the lower end of transfer line 76, air is supplied through a valved line 78 as well as recycle gas through a line 80. The combined streams of air and recycle gas and combustion products resulting from the reaction thereof serve to transport the spent catalyst to the lower part of heating vessel 60. Combustion of the recycle gas with the oxygen in the air may be complete before the combined gas and catalyst reach the heating vessel. The conditions of combustion in the heating vessel are such that the catalytic material is heated without significant change in the equilibrium coke or carbonaceous content thereof. A portion of catalytic material is withdrawn directly from the dense bed in the upper part of heating vessel 60, and it is transferred downwardly by means of a standpipe 82 to the reactor 5. The lower part of standpipe 82 contains a U-bend and, in order to facilitate the flow of catalyst therethrough, steam is supplied to the upper end of the downflow side of the U-bend, if required, by means of a valved line 84. Downstream of the point of injection of steam through line 84, there is situated a slide valve 86, for the purpose of automatically controlling the catalyst rate. The heated catalyst is returned to the upper part of the catalyst bed in reactor 5.

If so desired, as previously indicated, the spent catalyst withdrawn from standpipe 52 may be transferred in two portions through two separate transfer lines (instead of a single transfer line, viz., line 76, as shown in the drawing). One of these transfer lines is used to pass one portion of the spent catalyst to the heating vessel 60, and the other transfer line is used to pass the remaining portion of the spent catalyst to regenerator 62. These two portions of spent catalyst, thus transferred, are then treated in accordance with the process herein described.

Heated catalyst is withdrawn from the bottom end of heating vessel 60 by means of a standpipe 90, which depends from partition 64 to the lower end of regenerator 62. The rate of catalyst which is being withdrawn from the heating vessel for transfer to the regenerator is controlled by means of a plug valve 92. The temperature in the regenerator is controlled by means of cooling coils 95, which are disposed or immersed within the dense bed of catalyst having a variable level 97 in the regenerator. Air is employed in the combustion of carbonaceous deposits on the catalytic material, and it is fed into the bottom of the regenerator through a distributor 100 and a supply line 102. The main supply of air for the system is furnished by means of line 105, which divides into line 102 and line 78, previously mentioned. The cooling coils 95 which are disposed within the catalyst bed of the regenerator are connected to an upper header 104 and a lower header 106. Water is supplied to lower header 106 by means of line 108, and any steam which is formed in cooling coils 95, along with heated water is discharged from the upper header 104 through a line 110. The regenerated catalyst is withdrawn from regenerator 62 by means of a standpipe 114, having its beginning in the lower part of the regenerator and the other part of this standpipe contains a U-bend to which steam is supplied, if required, by means of a valved line 116, in the same manner as discussed in connection with the standpipe 52. The downstream side of the U-bend contains a slide valve for the purpose of controlling the catalyst rate. The regenerated catalyst is returned to the lower part of reactor 5 at a point of about 5 feet above the lower tangent line of the reactor. Prior to discharging the regenerated catalyst into the reactor, it can be optionally subjected to a hydrogen pretreatment in a pretreating vessel 121, which has an internal diameter of 1.5 feet and a length of 10 feet. Hydrogen is supplied to the bottom part of the pretreating vessel 121 by means of a line 123 and a distributor 125. The hydrogen used for this purpose is the normally gaseous product produced in the process.

In operation, vaporized naphtha having a molecular weight of 109.1 is supplied through line 37 at a temperature of 1000° F. and at a rate of 351,940 pounds per hour. Recycle gas containing approximately about 60% of hydrogen and having a molecular weight of 14.4 is supplied through line 39 at a temperature of 1200° F. and a rate of 118,758 pounds per hour. For the purposes of this invention, it is preferred to preheat the naphtha to a temperature not greater than about 1000° F., usually, in the range of about 850° to about 1000° F. In the case of the recycle gas, high temperatures have a much lesser effect on the composition of the gas, however, it is preferred to preheat this gas to a temperature not greater than 1200° F., in order to provide an economical operation with respect to costs of heating and furnace construction. The recycle gas can be heated to a temperature of about 850° to about 1200° F. The combined streams of naphtha vapors and recycle gas are fed into the bottom end of the reaction zone through distributors 47 and 49.

An average temperature of 940° F. is maintained in the catalyst bed of the reactor 5. The pressure in the disengaging zone 11 is maintained at about 225 p.s.i.g. The quantity of catalyst which is present in the reactor, relative to the oil rate, provides a weight space velocity of 0.35. The hydrogen rate, expressed on a different basis, is 2500 s.c.f.b. The catalyst slurry being fed to the top part of the catalyst bed through line 35 is charged at the rate of 1540 pounds per hour of polymer and gasoline having a 43.0 API° gravity and 318 pounds per hour of catalyst fines. Optionally, the regenerated catalyst can be pretreated with recycle gas having a molecular weight of 14.4 and the recycle gas is used at the rate of 2877 pounds per hour. The reactor contains 475.5 tons of catalyst and the reactant materials pass upwardly therethrough at a superficial linear gas velocity of 0.74 foot per second, thus providing a catalyst bed having a density of 33.8 pounds per cubic foot. Reaction product is withdrawn as split streams 21 and 23, each stream being yielded at the rate of 250,283 pounds per hour and it has a molecular weight of 29.8. Each stream also contains approximately 159 pounds per hour of entrained catalyst fines.

Spent catalyst is withdrawn from the reactor bed through louvres 25 and passes into stripper 7, the top temperature of which is about 935° F. due to the upward passage of relatively lower temperature stripping gas. The spent catalyst flows downwardly over baffles 27 in countercurrent contact with stripping steam, which is supplied through line 21 at a temperature of about 600° F. and at a rate of about 25,450 pounds per hour. The temperature in the bottom of the stripper is about 925° F. The stripping steam passes upwardly in stripper 7 at a superficial linear gas velocity of 0.55 foot per second, thus providing a dense fluid bed having a density of about 36 pounds per cubic foot. The stripped catalyst flows into standpipe 76 to which there is fed 2,360 pounds per hour of recycle gas and 36,555 pounds per hour of air. The spent catalyst is fed into the bottom of heating vessel 60 by means of transfer line 76, and in the heating vessel, the temperature is maintained at 1100° F. The pressure in the heating vessel, above the catalyst bed, is about 225 p.s.i.g. The quantity of air and recycle gas being fed to the heating vessel are sufficient to heat the catalyst from the temperature at which it exists in the reactor to 1100° F., removing a minimum of carbonaceous deposits by burning. The equilibrium carbon content of the catalyst is 1.4% by weight, based on the total catalyst, and this carbon content remains substantially the same despite the combustion conditions existing in heating vessel 60 and line 76. The heated catalyst is withdrawn directly from the dense bed in the heating vessel at the rate of 660,000 pounds per hour, and this includes the coke content of the catalyst. The superficial linear gas velocity of the reactant materials passing upwardly through the catalyst in the heating vessel is 0.45 foot per second, and this provides a bed density of 33 pounds per cubic foot. 219,000 pounds per hour of catalytic material are withdrawn from the heating vessel, through standpipe 90, for transfer to regenerator 62. 56,395 pounds per hour of air are fed directly into the bottom of the regenerator through line 102. As a result of the combustion of the carbonaceous material which is on the catalyst, heat is generated and it is removed by means of cooling tubes 95 in order to maintain the temperature at 1100° F. The reactant materials pass upwardly through the catalyst bed of the regenerator at a superficial linear gas velocity of 0.5 foot per second, thus providing a density of 33 pounds per cubic foot. The pressure in the top of the regenerator is approximately 225 p.s.i.g. 57,695 pounds per hour flue gas having a molecular weight of 29.4 are discharged from the regenerator through conduit 66, and thence pass into the upper part of heating vessel 60. Regenerated catalyst is withdrawn from the bottom part of the regenerator at the rate of 216 pounds per hour and it is fed into the reactor in the manner described hereinabove.

Having thus described my invention by reference to a specific example thereof, it is to be understood that no undue limitations or restrictions are to be imposed by reason thereof, but that the scope of the present invention is defined by the appended claims.

I claim:

1. A process which comprises withdrawing a first portion of solid contact material containing combustible material from an endothermic contacting zone and passing the same to a first combustion zone wherein at least part of the combustible material is burned with an oxygen containing gas and the solid material is thus heated, circulating the heated solids from the first combustion zone to the endothermic zone, withdrawing a second portion of solid contact material containing combustible material from the endotherimc zone and passing the same to a second combustion zone to which a combustible material is charged and burned preferentially by means of an oxygen containing gas thus heating the solid material without affecting significantly the equilibrium combustible content of the solid material, and circulating the heated solids from the second zone to the endothermic zone.

2. The process of claim 1 in which the combustible material supplied to the second combustion zone is a normally gaseous material.

3. The process of claim 1 in which the combustible material supplied to the second combustion zone is a normally liquid material.

4. A hydrocarbon conversion process which comprises contacting a hydrocarbon reactant with a solid contact material in a reaction zone under suitable endothermic conversion conditions thus producing a gaseous reaction product and contaminating the solid material with a carbonaceous deposit, withdrawing a portion of contaminated solids from the reaction zone and passing the same to a first combustion zone wherein it is regenerated by removing the carbonaceous material to the extent desired by means of burning with an oxygen containing gas, passing the regenerated solid material to the reaction zone, withdrawing a second portion of contaminated solid material from the reaction zone and passing the same to a second combustion zone, passing a combustible material to the second combustion zone such that it is burned by means of an oxygen containing gas in the presence of the solid material preferentially to the carbonaceous deposit thereon thus imparting heat to the solids without affecting significantly the equilibrium coke content, and passing the heated solids from the second combustion zone to the reaction zone.

5. A process which comprises contacting a hydrocarbon reactant with a dense fluidized mass of finely divided solid material in a reaction zone under suitable endothermic conversion conditions thus producing a gaseous reaction product and contaminating the solid material with a carbonaceous deposit, withdrawing a portion of contaminated solid material from the reaction zone and passing the same to a first combustion zone wherein it is regenerated by removing the carbonaceous material to the extent desired by means of burning with an oxygen containing gas, passing the regenerated solid material to the reaction zone, withdrawing a second portion of solid material from the reaction zone and passing the same to a second combustion zone, supplying a combustible material to the second combustion zone such that it is burned by means of oxygen containing gas in the presence of the solid material preferentially to the carbonaceous deposit thereon thus imparting heat to the solid material without affecting significantly the equilibrium coke content, and passing the heated solid material from the second combustion zone to the reaction zone.

6. A hydrocarbon conversion process wherein a hydrocarbon reactant is contacted with a dense fluidized mass of finely divided solid catalytic material in a reaction zone under suitable endothermic conversion conditions including a catalyst to oil ratio of about 0.05 to about 2.5 for the maintenance of catalytic activity thus producing a gaseous reaction product and contaminating the catalyst with a carbonaceous deposit, the improvement which comprises withdrawing a portion of contaminated catalyst from the reaction zone and passing the same to a first combustion zone wherein it is regenerated by removing the carbonaceous material to the extent desired by means of burning with an oxygen containing gas, passing the regenerated catalyst to the reaction zone, withdrawing a second portion of catalyst from the reaction zone and passing the same to a second combustion zone, supplying a combustible material to the second combustion zone such that it is burned by means of oxygen containing gas in the presence of the catalyst preferentially to the carbonaceous deposit thereon thus imparting heat to the catalyst without affecting significantly the equilibrium coke content, and passing the heated catalyst from the second combustion zone to the reaction zone.

7. A hydrocarbon conversion process wherein a hydrocarbon reactant is contacted with a dense fluidized mass of solid catalytic material in a reaction zone under suitable endothermic conversion conditions including a catalyst to oil ratio of about 0.05 to about 2.5 for the maintenance of catalytic activity thus producing a gaseous reaction product and contaminating the catalyst with a carbonaceous deposit, the improvement which comprises withdrawing a portion of contaminated catalyst from the reaction zone and passing the same to a first combustion zone at a rate sufficient to maintain the desired catalyst activity and wherein it is regenerated by removing the carbonaceous material to the extent desired by means of burning with an oxygen containing gas, passing the regenerated catalyst to the reaction zone, withdrawing a second portion of contaminated catalyst from the reaction zone at a rate sufficient to provide a ratio of about 1–5:1 of withdrawn catalyst to aforesaid regenerated catalyst on a weight basis and passing the same to a second combustion zone, passing a combustible material to the second combustion zone such that it is burned by means of an oxygen containing gas in the presence of the solid material preferentially to the carbonaceous deposit thereon thus imparting heat to the catalyst without affecting significantly the equilibrium coke content to the catalyst, and passing the heated catalyst from the second combustion zone to the reaction zone.

8. A hydrocarbon conversion process wherein a hydrocarbon reactant is contacted with a dense fluidized mass of finely divided solid catalytic material in a reaction zone under suitable endothermic conversion conditions including a catalyst to oil ratio of about 0.05 to about 2.5 for the maintenance of catalytic activity thus producing a gaseous reaction product and contaminating the catalyst with a carbonaceous deposit, the improvement which comprises withdrawing a portion of contaminated catalyst from the reaction zone at a rate sufficient to provide the maintenance of desired catalytic activity and passing the same to a first combustion zone wherein it is regenerated by removing the carbonaceous material to the extent desired by means of burning with an oxygen containing gas at a temperature of about 25° to about 300° F. greater than the temperature in the reaction zone, passing the regenerated catalyst to the reaction zone, withdrawing a second portion of contaminated catalyst from the reaction zone at a rate sufficient to provide a ratio of about 1–5:1 of withdrawn catalyst to the aforesaid regenerated catalyst on a weight basis and passing the same to a second combustion zone, passing a combustible fluid material to the second combustion zone such that it is burned by means of an oxygen containing gas in the presence of the catalyst preferentially to the carbonaceous deposit thereon at a temperature of about 25° to about 300° F. greater than the temperature in the reaction zone thus imparting heat to the catalyst without affecting significantly the equilibrium coke content of the catalyst, and passing the heated catalyst from the second combustion zone to the reaction zone.

9. A reforming process which comprises contacting a light hydrocarbon oil with a dense fluidized mass of finely divided solid reforming catalyst in a reaction zone under suitable endothermic reforming conditions thus producing a gaseous reaction product and contaminating the catalyst with a carbonaceous deposit, withdrawing a portion of contaminated catalyst from the reaction zone and passing the same to a first combustion zone wherein it is regenerated by removing the carbonaceous material to the extent desired by means of burning with an oxygen containing gas, passing the regenerated catalyst to the reaction zone, withdrawing a second portion of catalyst from the reaction zone and passing the same to a second combustion zone, supplying a combustible material to the second combustion zone such that it is burned by means of an oxygen containing gas in the presence of the catalyst preferentially to the carbonaceous deposit thereon thus imparting heat to the catalyst without affecting significantly the equilibrium coke content, and passing the heated catalyst from the second combustion zone to the reaction zone.

10. A reforming process which comprises contacting a light hydrocarbon oil with a dense fluidized mass of finely divided solid reforming catalyst in a reaction zone under suitable endothermic reforming conditions including a catalyst to oil ratio of about 0.1 to about 2.0 for maintenance of catalytic activity thus producing a gaseous reaction product and contaminating the catalyst with a carbonaceous deposit, the improvement which comprises withdrawing a portion of contaminated catalyst from the reaction zone and passing the same to a first combustion zone wherein it is regenerated by removing the carbonaceous material to the extent desired by means of burning with an oxygen containing gas, passing the regenerated catalyst to the reaction zone, withdrawing a second portion of catalyst from the reaction zone and passing the same to a second combustion zone, supplying a combustible material to the second combustion zone such that it is burned by means of an oxygen containing gas in the presence of the catalyst preferentially to the carbonaceous deposit thereon thus imparting heat to the catalyst without affecting significantly the equilibrium coke content, and passing the heated catalyst from the second combustion zone to the reaction zone.

11. A reforming process which comprises contacting a light hydrocarbon oil with a dense fluidized mass of finely divided solid reforming catalyst in a reaction zone under suitable endothermic reforming conditions including a catalyst to oil ratio of about 0.1 to about 2.0 for the maintenance of catalytic activity thus producing a gaseous reaction product and contaminating the catalytic material with a carbonaceous deposit, the improvement which comprises withdrawing a portion of contaminated catalyst from the reaction zone and passing the same to a first combustion zone at a rate sufficient to maintain the desired catalyst activity and wherein it is regenerated by removing the carbonaceous material to the extent desired by means of burning with an oxygen containing gas, passing the regenerated catalyst to the reaction zone, withdrawing a second portion of contaminated catalyst from the reaction zone at a rate sufficient to provide a ratio of about 1–5:1 of withdrawn catalyst to aforesaid regenerated catalyst on a weight basis and passing the same to a second combustion zone, passing the combustible material to the second combustion zone such that it is burned by means of an oxygen containing gas in the presence of the solid material preferentially to the carbonaceous deposit thereon thus imparting heat to the catalyst without affecting significantly the equilibrium coke content of the catalyst, and passing the heated catalyst from the second combustion zone to the reaction zone.

12. A reforming process which comprises contacting a light hydrocarbon oil with a dense fluidized mass of finely divided solid reforming catalyst in a reaction zone under suitable endothermic reforming conditions including a catalyst to oil ratio of about 0.1 to about 2.0 for the maintenance of catalytic activity thus producing a gaseous reaction product and contaminating the catalytic material with a carbonaceous deposit, the improvement which comprises withdrawing a portion of contaminated catalyst from the reaction zone at a rate sufficient to provide the maintenance of desired catalytic activity and passing the same to a first combustion zone wherein it is regenerated by removing the carbonaceous material to the extent desired by means of burning with an oxygen containing gas at a temperature of about 25° to about 300° F. greater than the temperature in the reaction zone, passing the regenerated catalyst to the reaction zone, withdrawing a second portion of contaminated catalyst from the reaction zone at a rate sufficient to provide a ratio of about 1–5:1 of withdrawn catalyst to the aforesaid regenerated catalyst on a weight basis and passing the same to a second combustion zone, passing a combustible fluid material to the second combustion zone such that it is burned by means of an oxygen containing gas in the presence of the catalyst preferentially to the carbonaceous deposit thereon at a temperature of about 25° to about 300° F. greater than the temperature in the reaction zone thus imparting heat to the catalyst without affecting significantly the equilibrium coke content of the catalyst, and passing the heated catalyst from the second combustion zone to the reaction zone.

13. A system which comprises a contacting means wherein solid material is contacted with a fluid material, a transfer means for passing solid material to an elevated combustion means, a second combustion means situated below said elevated combustion means, a second transfer means whereby solid material is passed from the elevated combustion means to the contacting means, a third transfer means whereby solids are passed from the elevated combustion means directly to the second combustion means, an outlet means adapted to pass gaseous material from the second combustion means to the elevated combustion means, and a fourth transfer means whereby solids are passed from the second combustion means to the contacting means.

14. A system which comprises a contacting means wherein solid material is contacted with a fluid material, a first vertical cylindrical regenerator, means for introducing oxygen containing gas to the first regenerator, a second vertical cylindrical regenerator superimposed on said first regenerator and separated therefrom by means of an impervious element, means for transferring solid material from the contacting means to the second regenerator, a vertical cylindrical conduit having its upper end connected to the bottom of said second regenerator and the lower end terminating in the bottom part of the first regenerator such that solid material can flow from the second regenerator directly to the first regenerator, a transfer means connected to the lower end of the first regenerator whereby solid material is withdrawn therefrom and passed to the contacting means, a vertical cylindrical conduit having its lower end connected to the bottom of said second regenerator and its upper end terminating in the second regenerator at a point above the location of the solid material therein thus providing for the passage of flue gas from the first regenerator to the second regenerator, transfer means adapted for introducing solids and oxygen containing gas to the second regenerator, and transfer means for withdrawing solids from the second regenerator and passing the same to the contacting means.

15. A system which comprises a vertical cylindrical reactor adapted to contain solid material for contact with a fluid, a vertical cylindrical stripper of smaller cross-sectional area than the reactor and situated within the reactor such that solid material flows from the reactor to the stripper, a first vertical cylindrical regenerator, transfer means adapted to transfer solid material from the first regenerator to the reactor, means for introducing oxygen containing gas into the first regenerator, a second vertical cylindrical regenerator superimposed on said first regenerator and separated therefrom, transfer means adapted for the passage of solid material from the stripper and gaseous materials to the said second regenerator, transfer means adapted for the passage of solid material from the second regenerator to the reaction zone, a vertical cylindrical conduit situated within said first regenerator and having its upper end connected to the bottom of the second regenerator and the lower end terminating in the bottom part of the first regenerator such that solid material is passed from the second regenerator to the first regenerator, a vertical cylindrical conduit situated within the second regenerator and having its lower end connected to the bottom thereof and the upper end above the solid material therein such that flue gas is passed from the first regenerator to the second regenerator, and means for removing gaseous material from the second regenerator.

16. A reforming process which comprises contacting a light hydrocarbon oil reactant with a suitable reforming catalyst in a reaction zone under endothermic reforming conditions thus producing a gaseous reaction product and contaminating the catalyst with a carbonaceous material, withdrawing contaminated catalyst from the reaction zone and passing the same to a first regeneration zone wherein it is contacted with a combustible fluid material and an oxygen containing gas under conditions such that the combustible material is burned preferentially to the carbonaceous material thus imparting heat to the catalyst without affecting the equilibrium coke content, passing a portion of the heated catalyst from the first regeneration zone to the reaction zone, passing the remaining portion of heated catalyst from the first regeneration zone to a second regeneration zone wherein it is contacted with an oxygen containing gas for the removal by combustion of at least part of the carbonaceous material, and passing the regenerated catalyst from the second regeneration zone to the reaction zone.

17. A process which comprises passing a first portion of solid contact material containing combustible material from an endothermic contacting zone to a first combustion zone, to which combustible material is charged and burned preferentially by means of an oxygen containing gas, thus heating the solid material without affecting significantly the equilibrium combustible content of the solid material, passing a second portion of contact material to a second combustion zone wherein at least part of the combustible material is burned with an oxygen containing gas and the solid material is thus heated, and circulating the heated solids to the endothermic zone.

18. A process which comprises: passing a first portion of a solid contact material containing combustible material from an endothermic contacting zone to a first combustion zone to which combustible material is charged and burned preferentially by means of an oxygen containing gas at a temperature of about 25° to about 300° F. greater than the temperature in the endothermic contacting zone, thus heating the solid material without affecting significantly the equilibrium combustible content of the solid material; passing a second portion of said solid contact material to a second combustion zone wherein at least part of the combustible material is burned with an oxygen containing gas at a temperature of about 25° to about 300° F. greater than the temperature in the endothermic contacting zone and the solid contact material is thus heated; and circulating the respective heated solid contacting materials to the endothermic contacting zone.

References Cited in the file of this patent

UNITED STATES PATENTS

| | | |
|---|---|---|
| 2,407,371 | Jahnig | Sept. 10, 1946 |
| 2,429,721 | Jahnig | Oct. 28, 1947 |
| 2,465,255 | Moorman | Mar. 22, 1949 |
| 2,562,225 | Wickham et al. | July 31, 1951 |
| 2,602,771 | Munday et al. | July 8, 1952 |
| 2,606,863 | Rehbein | Aug. 12, 1952 |
| 2,710,827 | Gornowski | June 14, 1955 |